(12) United States Patent
Yamaguchi et al.

(10) Patent No.: US 6,913,319 B2
(45) Date of Patent: Jul. 5, 2005

(54) POWER ACTUATOR

(75) Inventors: Hiroyoshi Yamaguchi, Yokohama (JP); Hajime Shono, Yokohama (JP)

(73) Assignee: NHK Spring Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/331,008

(22) Filed: Dec. 26, 2002

(65) Prior Publication Data

US 2003/0227213 A1 Dec. 11, 2003

Related U.S. Application Data

(63) Continuation of application No. 09/526,650, filed on Mar. 15, 2000, now Pat. No. 6,513,880.

(30) Foreign Application Priority Data

| Mar. 15, 1999 | (JP) | ............................................. 11-67669 |
| Mar. 15, 1999 | (JP) | ............................................. 11-68356 |
| Mar. 26, 1999 | (JP) | ............................................. 11-82799 |
| Mar. 26, 1999 | (JP) | ............................................. 11-82802 |
| Mar. 10, 2000 | (JP) | ......................................... 2000-65922 |

(51) Int. Cl.$^7$ ......................................................... A47C 31/00
(52) U.S. Cl. ........................ 297/468; 297/480; 297/806
(58) Field of Search ................................ 297/468, 480, 297/378.11, 378.12, 463.1; 280/806; 60/632, 635, 637, 638

(56) References Cited

U.S. PATENT DOCUMENTS

| 2,970,862 | A | | 2/1961 | Racine ........................ 296/68.1 |
| 3,591,232 | A | | 7/1971 | Simon .......................... 397/216 |
| 3,858,930 | A | | 1/1975 | Calandra et al. .............. 296/65 |
| 3,917,031 | A | * | 11/1975 | Doin et al. .................. 188/375 |
| 3,972,561 | A | | 8/1976 | Breitschwerdt ............. 297/216 |
| 4,225,184 | A | * | 9/1980 | Strowick ..................... 297/468 |
| 4,589,696 | A | | 5/1986 | Kanai et al. ................. 297/284 |
| 4,623,192 | A | | 11/1986 | Koide et al. ................. 297/216 |
| 4,652,049 | A | | 3/1987 | Maruyama et al. ......... 297/284 |
| 4,705,296 | A | | 11/1987 | Anderson et al. ........... 280/806 |
| 4,767,155 | A | | 8/1988 | Kousaka et al. ............. 297/219 |
| 4,989,705 | A | | 2/1991 | Kashio et al. ................. 192/45 |
| 5,022,707 | A | | 6/1991 | Beauvais et al. ............ 297/216 |
| 5,125,472 | A | | 6/1992 | Hara ........................... 180/271 |
| 5,152,522 | A | * | 10/1992 | Yamashita ................... 271/264 |
| 5,152,552 | A | | 10/1992 | Ikegaya ...................... 280/806 |
| 5,186,494 | A | | 2/1993 | Shimose ..................... 280/806 |
| 5,282,672 | A | * | 2/1994 | Borlinghaus ................ 297/468 |
| 5,288,105 | A | | 2/1994 | Ikegaya et al. ............. 280/806 |

(Continued)

FOREIGN PATENT DOCUMENTS

| DE | 3841688 | 6/1990 |
| DE | 4423957 | 1/1996 |
| DE | 19707998 | 9/1999 |

(Continued)

*Primary Examiner*—Peter M. Cuomo
*Assistant Examiner*—Stephen Vu
(74) *Attorney, Agent, or Firm*—MacPherson Kwok Chen & Heid LLP; David S. Park

(57) ABSTRACT

Provided is a compact power actuator which is simple in structure, reliable in operation, and easy to install. The power actuator comprises a piston assembly which is received in a fixed cylinder for either directly or indirectly engaging a driven member, and a propellant for rapidly increasing the inner pressure of the cylinder to push the piston assembly outward so that the driven member may be instantaneously driven. A spring is interposed between the piston assembly and the propellant to urge the piston assembly in the projecting direction. The front end of the propellant fits into the central opening so that the available space may be fully utilized. Therefore, the size of the power actuator can be reduced, and the required amount of the pyrotechnic material for the propellant can be reduced due to the reduced initial volume of the chamber for the expansion of the generated gas.

20 Claims, 9 Drawing Sheets

U.S. PATENT DOCUMENTS

| | | | | |
|---|---|---|---|---|
| 5,288,108 A | * | 2/1994 | Eskew et al. | 285/15 |
| 5,340,185 A | | 8/1994 | Vollmer | 296/68.1 |
| 5,374,105 A | | 12/1994 | Kracht et al. | 297/216.1 |
| 5,403,037 A | | 4/1995 | Föhl | 280/806 |
| 5,405,180 A | | 4/1995 | Föhl | 297/478 |
| 5,449,214 A | | 9/1995 | Totani | 296/68.1 |
| 5,451,094 A | | 9/1995 | Templin et al. | 297/216.17 |
| 5,485,970 A | | 1/1996 | Steffens, Jr. | 242/374 |
| 5,490,706 A | | 2/1996 | Totani | 296/68.1 |
| 5,556,159 A | | 9/1996 | Canteleux | 297/216.1 |
| 5,556,160 A | | 9/1996 | Mikami | 297/216.1 |
| 5,647,628 A | | 7/1997 | Pires et al. | 296/68.1 |
| 5,647,635 A | | 7/1997 | Aumond et al. | 297/284.11 |
| 5,695,031 A | | 12/1997 | Kurita et al. | 192/45 |
| 5,695,242 A | | 12/1997 | Brantman et al. | 297/216.1 |
| 5,908,219 A | | 6/1999 | Böhmler | 297/216.1 |
| 5,941,355 A | | 8/1999 | Iga | 192/45 |
| 5,984,357 A | | 11/1999 | Yasuda et al. | 280/806 |
| 6,048,034 A | | 4/2000 | Aumont et al. | 297/478 |
| 6,050,635 A | | 4/2000 | Pajon et al. | 297/216.1 |
| 6,113,145 A | * | 9/2000 | Evans | 280/806 |
| 6,113,185 A | | 9/2000 | Yamaguchi et al. | 297/216.1 |
| 6,131,951 A | * | 10/2000 | Chicken et al. | 280/806 |
| 6,164,700 A | * | 12/2000 | Masuda et al. | 280/806 |
| 6,254,181 B1 | | 7/2001 | Aufrere et al. | 297/216.1 |
| 6,361,109 B1 | | 3/2002 | Tokarz et al. | 297/344.15 |
| 6,386,631 B1 | | 5/2002 | Masuda et al. | 297/216.1 |
| 6,450,573 B1 | | 9/2002 | Yamaguchi et al. | 297/216.1 |
| 6,460,819 B1 | | 10/2002 | Mühlberger et al. | 248/421 |
| 6,513,880 B2 | * | 2/2003 | Yamaguchi et al. | 297/468 |
| 2001/0022460 A1 | | 9/2001 | Kondo et al. | |

FOREIGN PATENT DOCUMENTS

| | | |
|---|---|---|
| EP | 0306299 | 3/1989 |
| EP | 0455859 | 11/1991 |
| EP | 0965479 | 12/1999 |
| GB | 2330334 | 4/1999 |
| GB | 2337726 | 12/1999 |
| GB | 2342076 | 4/2000 |
| JP | 58-53525 | 3/1983 |
| JP | 1-275230 | 11/1989 |
| JP | 2-149328 | 12/1990 |
| JP | 3-61440 | 6/1991 |
| JP | 3-227745 | 10/1991 |
| JP | 3-121947 | 12/1991 |
| JP | 4-93222 | 8/1992 |
| JP | 5-229378 | 9/1993 |
| JP | 07081466 | 3/1995 |
| JP | 7-309205 | 11/1995 |
| JP | 10-181527 | 7/1998 |
| JP | 10-181529 | 7/1998 |
| JP | 2000-272446 | 6/2000 |
| JP | 2000-264114 | 9/2000 |
| JP | 2001-180409 | 7/2001 |

* cited by examiner

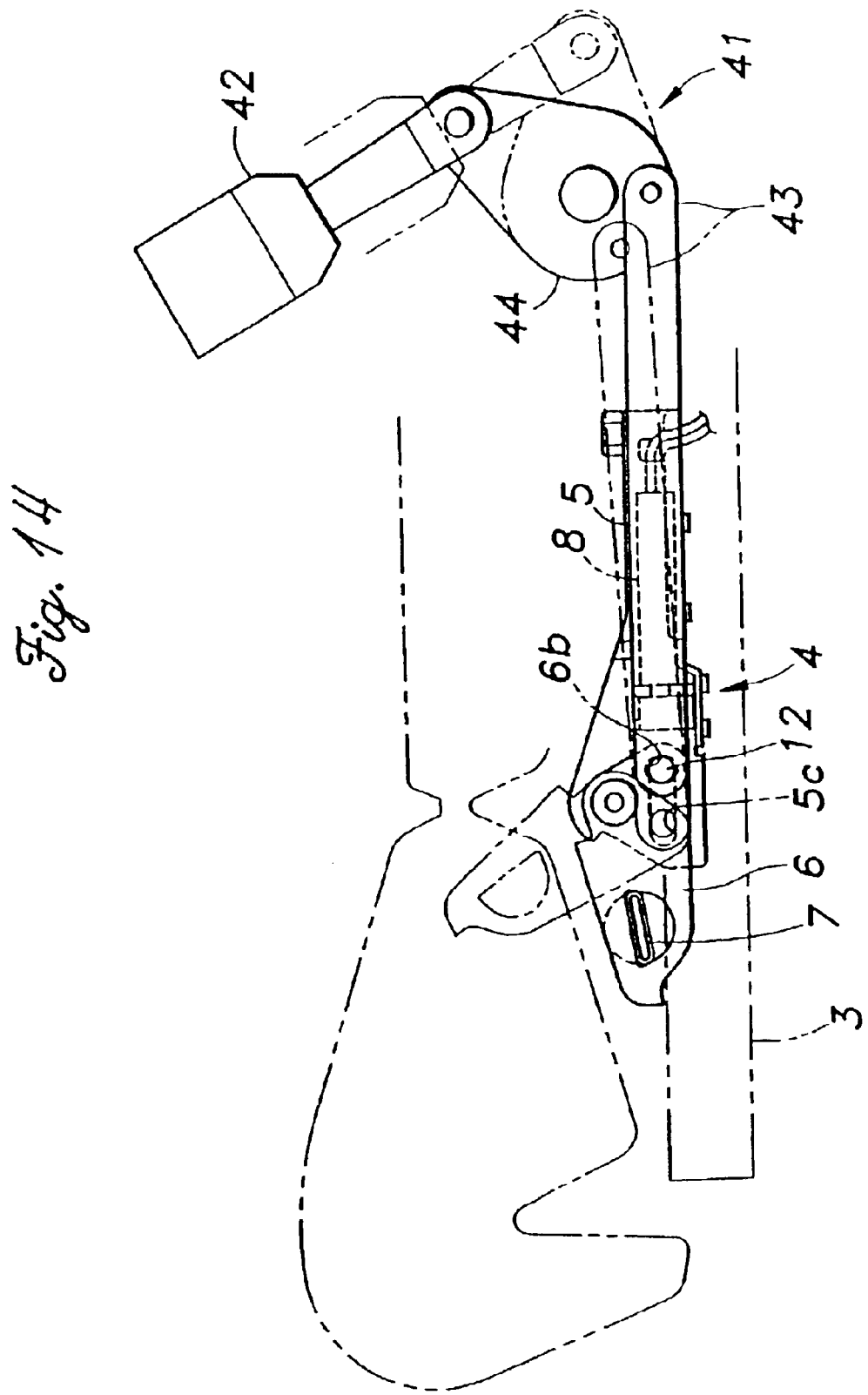

POWER ACTUATOR

CROSS REFERENCE TO RELATED APPLICATIONS

This application is a continuation of U.S. application Ser. No. 09/526,650, filed Mar. 15, 2000, now U.S. Pat. No. 6,513,880, issued on Feb. 4, 2003 which is commonly owned and incorporated herein by reference for all purposes.

Copending U.S. patent application Ser. No. 09/334,116 filed Jun. 15, 1999, and three commonly assigned U.S. patent applications of even date are directed to similar subject matters, and the contents of these applications are incorporated herein by reference.

TECHNICAL FIELD

The present invention relates to a vehicle occupant restraint system adapted to be fitted to a vehicle seat to prevent a vehicle occupant from slipping forward under the seat belt in case of an impact situation such as a vehicle crash, and a power actuator for instantaneously driving a driven member for such a device and other high speed mechanisms.

BACKGROUND OF THE INVENTION

It is known that the so-called submarine phenomenon may occur in an impact situation such as a vehicle crash by the vehicle occupant slipping forward under the seat belt, and the waist belt failing to restrain the pelvis of the vehicle occupant. This is prone to occur when the occupant sits in the front end of the seat or when the back rest is tilted rearward, and reduces the effectiveness of the seat belt in restraining the vehicle occupant or prevents the desired parts of the vehicle occupant from being restrained.

Therefore, it is conceivable to raise the front end of the seat by providing a projection in a front end of the seat frame, or by installing a panel in a front end of the seat frame. However, a desired effect in preventing submarining may not be achieved if the projection or the panel is too low, and the comfort of the vehicle occupant may be impaired if it is too low.

It has been previously proposed to raise the front end of the seat only in case of an impact. Such proposals include those using an air bag (Japanese patent laid-open (kokai) publications No. 5-229378, No. 7-81466, and No. 3-227745), those which mechanically raise the front end of the seat (Japanese UM laid-open (kokai) publications No. 2-149328, No. 3-121947, and No. 4-93222), and those using a pyrotechnic actuator to mechanically raise the front end of the seat (Japanese UM laid-open (kokai) publication No. 3-61440).

A conventional power actuator 50 using high pressure gas is illustrated in FIG. 15. A cylinder 51 fixedly attached to a base member of the seat is provided with an inner bore 51a having a reduced diameter portion 51b in an intermediate part thereof, and receives a piston 52 in one end portion thereof. A free end 52a of the piston 52, which is integrally attached to the main body portion, for instance via a threaded engagement means, projects from an open end of the cylinder 51, and engages a front end of a seat via a link member or the like. The base end 52b of the piston 52 is provided with a somewhat enlarged diameter, and engages the inner circumferential surface of the cylinder inner bore 51a via an O-ring 53. The open one end of the cylinder 51 is fixedly closed by a cap 54 having a central opening 54a. The opening 54a slidably receives an intermediate part of the piston 52 so as to serve as a slide bearing for the movement of the piston 52.

The other end portion of the inner bore 51a of the cylinder 51 receives a propellant 55. The rear open end of the cylinder 51 is crimped on the rear end of the propellant via a retaining plate 57, serving also as a seal, and is thereby closed so as to keep the propellant 55 in place.

The above described structure is typically installed in a vehicle with the piston 52 pushed all the way into the bottom of the inner bore 51a of the cylinder 51. However, if the gap between the base end 52b of the piston 52 and the shoulder of the reduced diameter portion 51b is too small, some difficulty may be encountered in installing the assembly to the vehicle due to possible dimensional errors in the various component parts of the pretensioner device (such as those found in the joints of the link members, the base member of the seat, and the cylinder retainer) and positional errors of the link members. If there is any play in the joint between the free end 52a of the piston 52 and the associated link member, and the joint between the link member and the buckle, impacts resulting from the cumulative effect of such plays may cause local plastic deformations, and energy loss of the high pressure gas.

Also, to prevent the vehicle occupant from being thrown forward in case of a vehicle crash or the like, it has been proposed to fit an automotive seat with a pretensioner device which is adapted to increase the restraint by the seat belt to restrain the forward movement of the vehicle occupant by rapidly pulling a buckle attached to a seat belt in the direction to increase the tension of the seat belt (U.S. Pat. No. 4,705,296).

Japanese patent laid open (kokai) publication No. 10-181527 discloses such a pretensioner device which is provided with a power actuator using a chemically produced high pressure gas for pulling a buckle. Such prior art devices involves some problems due to such plays. It is conceivable to install mechanisms to remove such plays in each device, but such mechanisms tend to increase the size of the device.

BRIEF SUMMARY OF THE INVENTION

In view of such problems of the prior art, a primary object of the present invention is to provide a power actuator suitable for use in vehicle occupant restraint systems.

A second object of the present invention is to provide such a power actuator which is compact and capable of rapid actuation.

A third object of the present invention is to provide such a power actuator which is reliable in operation.

A fourth object of the present invention is to provide such a power actuator which is easy to install.

A fifth object of the present invention is to provide such a power actuator which can minimize an energy loss of its power source.

A sixth object of the present invention is to provide a vehicle occupant restraint system which is reliable in operation and easy to install.

According to the present invention, such objects can be accomplished by providing a vehicle occupant restraint system, comprising: a vehicle occupant restraint member moveable between a rest position and a deployed position; a power actuator supported by the seat frame for selectively driving the restraint member toward the deployed position; and a locking mechanism for retaining the restraint member substantially at the deployed position once the restraint member is deployed; the power actuator including a cylinder attached to the seat frame, a piston received in the cylinder, a propellant received in the cylinder to selectively apply a pressure to the piston, a piston rod extending from the piston and having a free end connected to the restraint member, and a spring member received in the cylinder to urge the piston out of the cylinder. The vehicle occupant restraint member typically consists of a slip preventing member, a seat belt buckle or an ELR device.

The spring member received in the cylinder effectively removes any play that may exist in the path of power transmission from the piston to the slip preventing member, and ensures a reliable operation of the system.

The present invention also provides a power actuator for rapidly actuating a driven member, comprising: a cylinder; a piston received in the cylinder; a propellant received in the cylinder to selectively apply a pressure to the piston, a piston rod extending from the piston and having a free end connected to a driven member; a spring member received in the cylinder to urge the piston out of the cylinder; and a front end of the propellant received in a central hole of the spring member.

Because the front end of the propellant is received in the central hole of the spring member, the volume of the chamber for the initial expansion of the combustion gas of the propellant is minimized, and the energy of the propellant can be efficiently utilized. Also, because the waste of the space between the piston and the propellant is minimized, it also contributes to the compact design of the power actuator. In particular, owing to the axial overlap between the spring member and the propellant, the axial length of the power actuator can be minimized. Typically, the driven member consists of a member for restraining a vehicle occupant in a vehicle crash situation, and the spring member consists of a compression coil spring.

According to a preferred embodiment, the front end of the propellant is received in the central hole of the spring member in such a manner that a gap is defined between the front end of the propellant and an opposing end of the piston in a fully compressed state of the spring member. Preferably, the propellant comprises a small diameter portion facing the piston, and a large diameter portion remote from the piston, a shoulder defined between the portions serving as a seat for the spring member. Therefore, even when an external force is applied to the piston rod or the piston, the propellant is protected from damage and deformation. The use of the shoulder of the propellant as a spring seat eliminates the need for a separate spring seat, and reduces the number of component parts.

When an inner bore of the cylinder includes a shoulder opposing the shoulder of the propellant, and a resilient annular seal member is interposed between the shoulders of the cylinder inner bore and the propellant, the positional error of the propellant can be favorably accommodated, and the precision required in the arrangement for closing the rear end of the cylinder is relaxed. In such a case, to simplify the manufacturing process of the power actuator, the other end of the cylinder adjacent to the propellant may be closed by crimping material of the piston over the propellant via a retaining plate.

For the convenience of handling of the power actuator, the piston rod may simply abut an opposing end of the piston so as to be readily separated therefrom, and an end of the inner bore remote from the propellant is larger than the piston rod but smaller than the piston in diameter. For instance, the piston rod may simply abut an opposing end of the piston via a spherical joint or a conical surface joint. Therefore, the alignment between the piston and the piston rod is automatically achieved, and the piston is protected from undesirable loads due to tilting of the piston. Also, the piston rod can be separated from the power actuator for shipment or other handling before the assembly work, and even in case of inadvertent ignition of the propellant, the piston simply moves inside the cylinder, and no harm or damage is done to other parts.

Normally, a vehicle occupant restraint member is required to maintain its deployed position once it is deployed. In view of this recognition, the power actuation may be provided with a one-way lock mechanism for preventing reversal motion once the piston rod is actuated.

Once the piston rod is assembled to the power actuator, it is preferable to provide a means for preventing inadvertent removal of the piston rod. To this end, a piston rod retaining member may be provided at an end of the cylinder remote from the propellant for resisting inadvertent movement of the piston rod during handling but permitting movement of the piston rod when the piston is actuated by the propellant.

BRIEF DESCRIPTION OF THE DRAWINGS

Now the present invention is described in the following with reference to the appended drawings, in which:

FIG. 14 is side view similar to FIG. 2 showing the structure of a vehicle occupant restraint system combining a pretensioner with an arrangement for raising a front end of a vehicle seat.

DETAILED DESCRIPTION OF THE PREFERRED EMBODIMENTS

Figure 1:
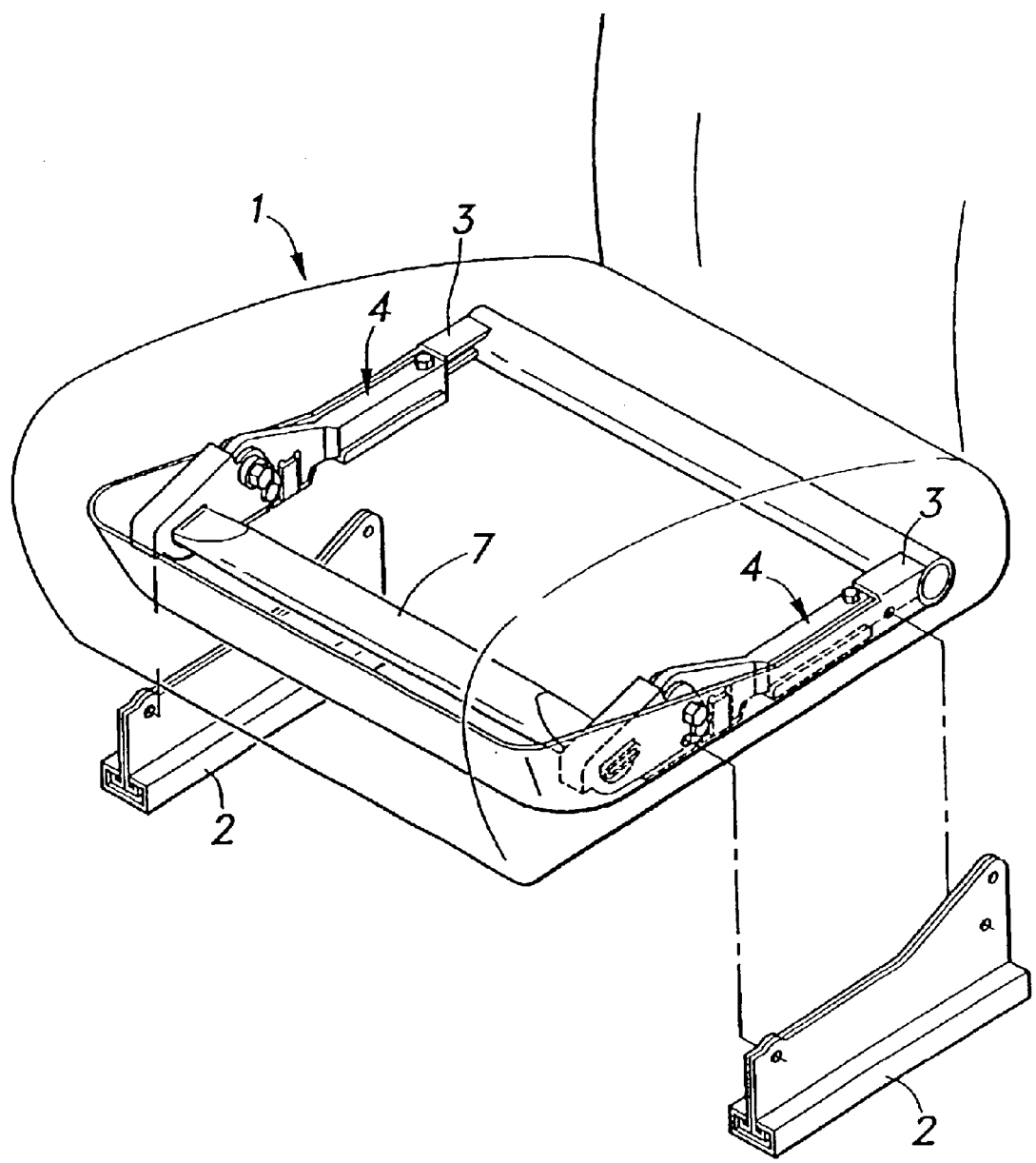
FIG. 1 is an exploded see-through perspective view of a vehicle seat fitted with power actuators embodying the present invention.
Figure 2:
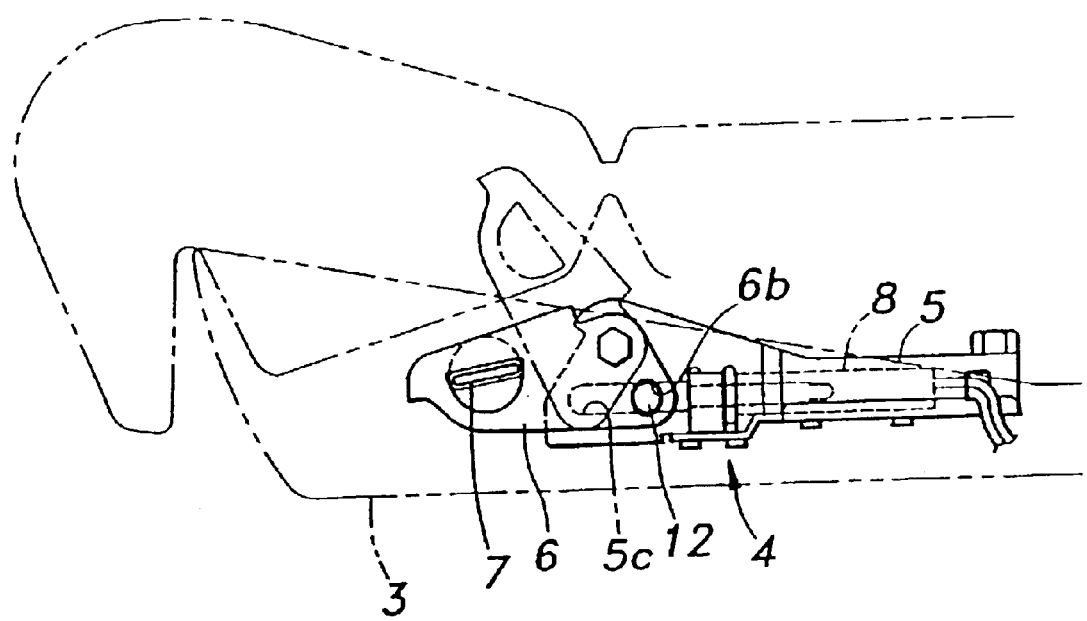
FIG. 2 is a schematic side view of the power actuator in the vehicle seat of FIG. 1.

FIG. 1 is a perspective view of a seat device 1 embodying the present invention, and FIG. 2 is a partly broken away fragmentary side view of this device. Seat rails 2 fixed to the vehicle body support a seat frame 3 so as to be slidable in the fore-and-aft direction, and a seat adjusting mechanism not shown in the drawings allows the seat frame 3 to be secured at a desired position. A pair of submarine preventing device subassemblies 4 are attached to either side of the seat frame 3 in a laterally symmetric manner. In this case, the seat frame 3 consists of a pan made of stamped sheet metal which is reinforced at the rear end by a pipe member.

Figure 3:
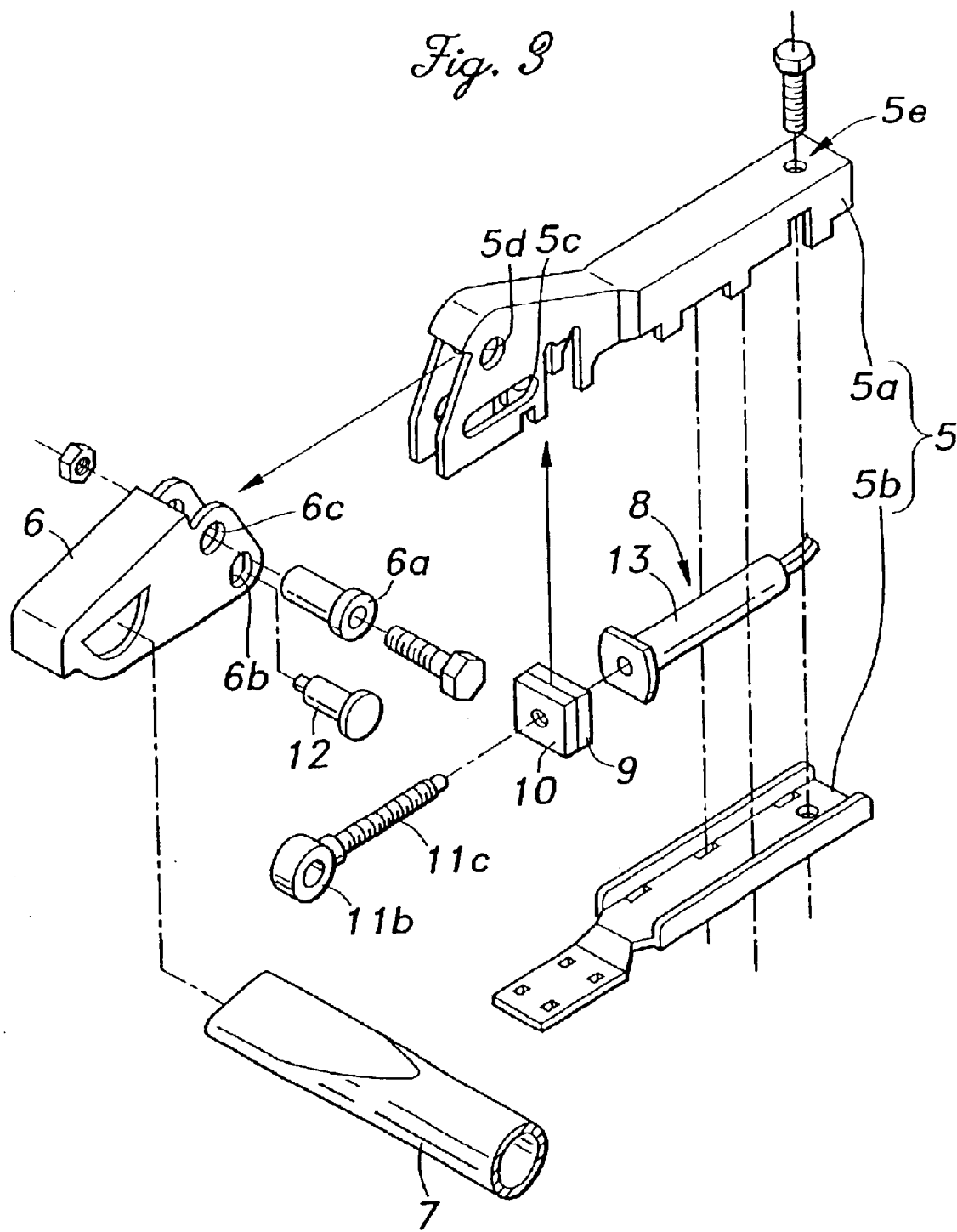
FIG. 3 is an exploded view of a subassembly of the vehicle occupant restraint system according to the present invention.
Figure 6:
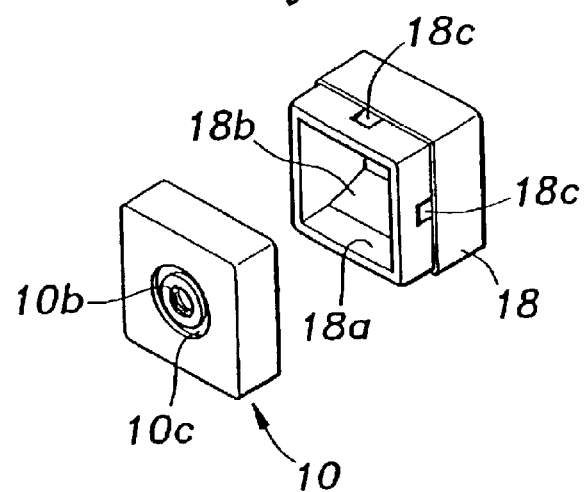
FIG. 6 is a perspective view of a housing for a reverse preventing mechanism for the power actuator provided with an arrangement for retaining the piston rod in the cylinder.

FIG. 3 shows the structure of each subassembly 4. Because the two subassemblies 4 have an identical structure, only the one on the right side is described in the following. The subassembly 4 of the vehicle occupant restraint system comprises a tubular casing 5 having a rectangular cross section, an arm 6 vertically rotatably supported at the front end of the casing 5 by a collar 6a passed through pivot holes 5d and 6c of the holder 5 and the arm 6, a hollow rod-shaped slip preventing member 7 having two ends connected to the corresponding arms 6, a power actuator 8 received in the casing 5 to actuate the slip preventing member 7 via the corresponding arm 6, and a one-way lock mechanism 9 supported by the casing 5 near the working end of the power actuator 8, and a piston rod retainer 10 (FIGS. 4 and 6) associated with the one-way lock mechanism 9 for retaining a piston rod 11b of the actuator 8 as described hereinafter. The free end of the piston rod 11b in the power actuator 8 is connected to a pin 12 which is passed through a horizontally elongated guide slot 5c formed in the casing 5 and a vertically elongated slot 6b provided in a part of the arm 6 offset from the pivot hole 5d. The power actuator 8 and the one-way lock mechanism 9 are retained in the casing 5 by introducing these assemblies into the main body 5a of the casing 5 having a C-shaped cross section and then crimping tabs extending from the main body 5a and passed into corresponding holes in the lid portion 5b. The collar 6a and the pin 12 are kept in place by enlarging the free ends thereof.

Figure 4:
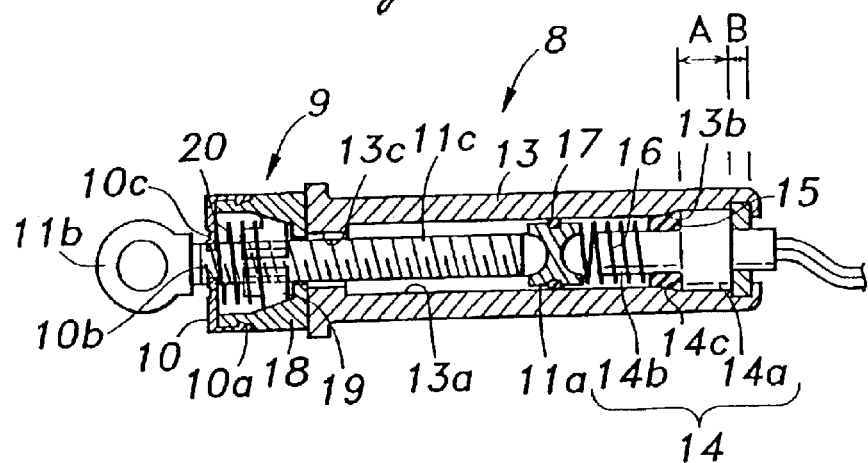
FIG. 4 is a sectional view of the power actuator for the vehicle occupant restraint system according to the present invention.

As shown in FIG. 4, the actuator 8 comprises a cylinder 13 fixedly attached to the seat frame 3 via the casing 5, a piston main body 11a received from the open working end of an inner bore 13a of the cylinder 13, and a propellant 14 received in the base end of the inner bore 13a. A compression coil spring 16 and a resilient annular seal member 15 are interposed between the piston main body 11a and the propellant 14 to normally urge the piston main body 11a in the direction of activation (or the projecting direction). The seal member 15 may consist of any suitable kind such as an O-ring which has a resiliency in the axial direction, and is effective in preventing the leakage of generated gas.

The propellant 14 comprises a large diameter portion 14a on the base end thereof, and a small diameter portion 14b from which gas issues on the front end thereof. A shoulder 14c defined between these portions engages a corresponding shoulder 13b defined in the cylinder 13. The propellant 14 is passed through the central opening of the seal member 15, and is received by the central opening of the compression coil spring 16. The shoulder of the propellant 14 additionally serves as a seat for the compression coil spring 16 via the seal member 15. The front end small diameter portion 14b of the propellant 14 is received in the central opening of the compression coil spring 16 to such an extent that a gap may be defined between the piston main body 11a and the front end of the small diameter portion 14b even when the compression coil spring 16 is fully compressed. Therefore, even when the piston main body 11a is subjected to an external force which would force it toward the propellant 14, the piston main body 11a would not hit the front end of the small diameter portion 14b on the front end of the propellant 14 so that the propellant 14 is protected from damage and deformation. Also, because the small diameter portion 14b on the front end of the propellant 14 occupies the inner bore of the shoulder 13b of the cylinder 13 and is passed into the central opening of the compression coil spring 16, the initial volume of the chamber for the expansion of the generated gas can be minimized by reducing the wasted volume so that the necessary amount of the pyrotechnic material for the propellant 14 is minimized.

The piston main body 11a engages the wall surface of the inner bore 13a via an O-ring 17. A piston assembly 11 is formed by the piston main body 11a and a piston rod 11b which abuts the piston main body 11a from the axial direction and provided with a free end attached to the arm 6. The piston main body 11a and the piston rod 11b engage each other via a contact between a concentrically curved recess, and a corresponding concentrically curved projection having a somewhat smaller curvature so that the two parts are automatically aligned and the piston rod 11b would not tilt inside the cylinder 13. Typically, the recess and the projection may be provided with corresponding spherical surfaces. Therefore, energy loss and gas leakage can be avoided.

Figure 5:
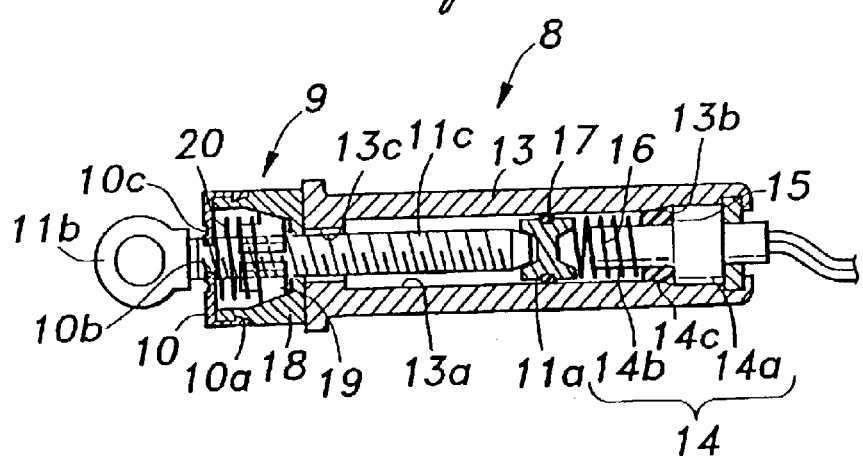
FIG. 5 is a view similar to FIG. 4 showing an alternate embodiment of the power actuator.

In practice, the surfaces are not necessarily required to be curved, but may also consist of tapered surfaces as illustrated in FIG. 5. In that case, the taper of the projection should be steeper than the taper of the recess. It is also possible to combine a tapered recess with a spherical projection.

As described earlier, the compression coil spring 16 normally urges the piston main body 11a in the direction of activation so that the piston rod 11b is also urged in the direction of activation, and the plays that may be present in the joint between the piston rod 11b and the piston main body 11a may be absorbed. The compression coil spring may be substituted with a dish spring or a rubber-like elastomer member. The open end 13c of the cylinder 13 on the working end is reduced in diameter so as to slidably engage the outer circumferential surface of the intermediate part of the piston rod 11b.

For the convenience of handling of the power actuator, the piston rod simply abuts an opposing end of the piston so as to be readily separated therefrom. Also, an end of the inner bore remote from the propellant is larger than the piston rod 11c but smaller than the piston 11a in diameter. Therefore, even in case of inadvertent ignition of the propellant, the piston main body simply moves inside the cylinder, and no harm or damage is done to other parts.

The procedure of assembling the actuator 8 is described in the following. First of all, from the end remote from the open working end 13c of the cylinder 13, the piston main body 11a, the compression coil spring 16, the seal member 15, the propellant 14, and a retaining plate 27 (FIG. 13) are placed, in that order, into the cylinder 13, and the material of the open base end of the cylinder 13 is crimped over the retaining plate 27. Because the crimping work is limited to the open base end of the cylinder 13, the efficiency of the assembly work is high. Because the resilient seal member 15 is interposed between the shoulder 13b of the cylinder 13 and the shoulder 14c of the propellant 14, possible dimensional errors in the size A of the propellant 14, and the crimping dimension B of the cylinder 13 can be absorbed by the resilient deformation of the seal member 15, and the propellant 14 is protected from damage and deformation during the crimping work.

At this point, the piston rod 11b may not be assembled to the actuator 8, and is handled separately from the actuator. Therefore, in case of an inadvertent activation of the propellant 14, it will only cause the piston main body 11a to move inside the cylinder 13, and this simplifies the handling of the actuator 8. Because the piston main body 11a is light in weight, there is no need to provide a sturdy cap to the open working end 13c of the cylinder 13, and it suffices to reduce the inner diameter of the corresponding part of the cylinder 13. Therefore, the radial dimension and weight are both minimized. This allows a highly low-profile design of the vehicle occupant restraining system so that a high level of freedom is achieved in layout, and the assembly work is simplified. Furthermore, the elimination of the need for machining that would be required if a cap were necessary also contributes to the simplification of the manufacturing process for the cylinder.

The front end of the power actuator 8 is provided with the one-way lock mechanism 9. The one-way lock mechanism 9 comprises a housing 18 surrounding the piston rod 11b and fixedly attached to the casing 5, and the housing 18 accommodates therein a plurality of engagement pieces 19, and a spring 20 urging the engagement pieces 19 toward the base end of the piston rod 11b or the cylinder 13. Each of the engagement pieces 19 is gradually reduced in outer diameter from the free end of the piston rod 11b to the base end thereof. The inner bore of the housing 18 includes a large diameter portion 18a and a tapered portion 18b which is gradually reduced in inner diameter away from the large diameter portion 18a. Therefore, in the state illustrated in FIG. 4, the engagement pieces 19 are pressed onto the tapered portion 18b of the housing 18 and engage the outer circumferential surface of the piston rod 11b under the biasing force of the spring 20. As the piston rod 11b moves in the projecting direction, the engagement pieces 19 are dragged in the projecting direction of the piston rod 11b against the spring force of the spring 20. As they move toward the large diameter portion 18a, the engagement pieces 19 move away from the piston rod 11b so that the piston rod 11b is allowed to move freely.

When the piston rod 11b is pushed back into the cylinder 13, the engagement pieces 19 move toward the tapered portion 18b under the spring force of the spring 20 and engage the outer circumferential surface of the piston rod 11b so that the piston rod 11b is securely fixed relative to the cylinder 13. At this point, the piston main body 11a is urged against the corresponding end of the piston rod 11b under the spring force of the compression coil spring 16. The inner circumferential surface of each of the engagement pieces 19 is provided with annular grooves or thread grooves while the outer circumferential surface of the piston rod 11b is provided with corresponding annular grooves or thread grooves 11c. Therefore, as the piston rod 11b is pushed into the cylinder 13, the inner circumferential surfaces of the engagement pieces 19 engage the outer circumferential surface of the piston rod 11b so that these two parts are firmly retained to each other, and are kept at a fixed position.

The free end of the one-way lock mechanism 9 is provided with a piston rod retainer 10 in the form of a lid for the housing 18. The piston rod retainer 10 fits onto the front end of the housing 18, and is fixedly secured thereon by an engagement between an engagement groove 18c of the housing 18 with the engagement portion 10a of the piston rod retainer 10. The piston rod retainer 10 has a central opening 10b provided with annular or thread grooves for engagement with the corresponding grooves 11c of the piston rod 11b. The part of the housing 18 surrounding the central opening 10b is provided with a thin-walled portion 10c. Thus, even when the piston rod 11b is pushed in the projecting direction under a normal condition, the piston assembly 11 remains stationary due to the engagement between the annular or thread grooves formed in the inner circumferential surface of the central opening 10b and the outer circumferential surface of the piston rod 11b. However, a load greater than a prescribed threshold level such as that would be produced by the thrust of the propellant 14, the thin-walled portion 10c is destroyed, and the piston rod 11b is allowed to project.

The two arms 6 are firmly connected to each other by the laterally extending slip preventing member 7. Each of the subassemblies 4 of the vehicle occupant restraint system is attached to the seat frame 3 by threaded bolts passed through the collar 6a and a hole 5e formed in the rear end of the casing 5.

The vehicle occupant restraint system is thus formed by the two subassemblies of the system on either side in combination with an impact detecting means typically consisting of an acceleration sensor and a control unit not shown in the drawing. Such an arrangement for controlling the activation of a vehicle occupant restraint system is per se known, and is not described herein.

This vehicle occupant restraint system may be installed in a seat during the assembly work or may be retrofitted to an existing seat. When installing the device in a seat during the assembly work, and welding is required to be performed, the subassemblies 4 of the vehicle occupant restraint system each fitted with the power actuator 8 incorporated with a propellant may be installed after completing the welding process. The seat frame 3 was supported by the seat rails 2 via the slidable holders in the above described embodiment, but may be attached to mounting brackets in case of a tiltable and/or liftable seat.

Now the mode of operation of this embodiment is described in the following. First of all, under a normal condition, because of the engagement between the inner circumferential surface of the opening 10b and the thread grooves 11c on the outer circumferential surface of the piston rod 11b, the piston assembly 11, the arm 6 engaged thereby, and the slip preventing member 7 are kept stationary and prevented from any inadvertent movement. However, when a vehicle crash is detected by a deceleration sensor not shown in the drawing, gas is generated from the propellant 14, and the resulting rapid increase in the inner pressure of the cylinder 13 instantaneously pushes out the free end of the piston assembly 11 from the cylinder 13. This load is transmitted to the opening 10c of the piston rod retainer 10 engaging the free end of the piston assembly 11 or the annular or thread grooves 11c on the free end of the piston rod 10b, and the free end of the piston assembly 11 is allowed to project instantaneously from the cylinder by breaking the thin-walled portion 10c of the piston rod retainer 10. As a result, the arm 6 attached to the free end of the piston rod 11b turns in clockwise direction as indicated by the imaginary lines in FIG. 2, and the slip preventing member 7 is raised, optionally along with the corresponding part of the seat, so that the submarining of the vehicle occupant can be prevented. Even after the generation of gas from the propellant 14 has ceased, and the drive force of the power actuator 8 has been lost, the raised slip preventing member 7 would not come down, and maintains the action to prevent submarine.

The one-way lock mechanism was provided on each side of the seat in the above described embodiment, but may also be provided only on one side of the seat if a required mechanical strength is ensured. Also, two one-way lock mechanisms having different constructions may be arranged on either side. For instance, the above described one-way lock mechanism may be provided on one side while a ball-type one-way lock mechanism capable of locking at any desired position is provided on the other side. When two power actuators are used on either side of the seat, each of the power actuators may consist of a relatively small device so that any localized increase in the size of the device can be avoided by proper distribution of compact devices, although it is possible to use only one power actuator.

Figure 7:
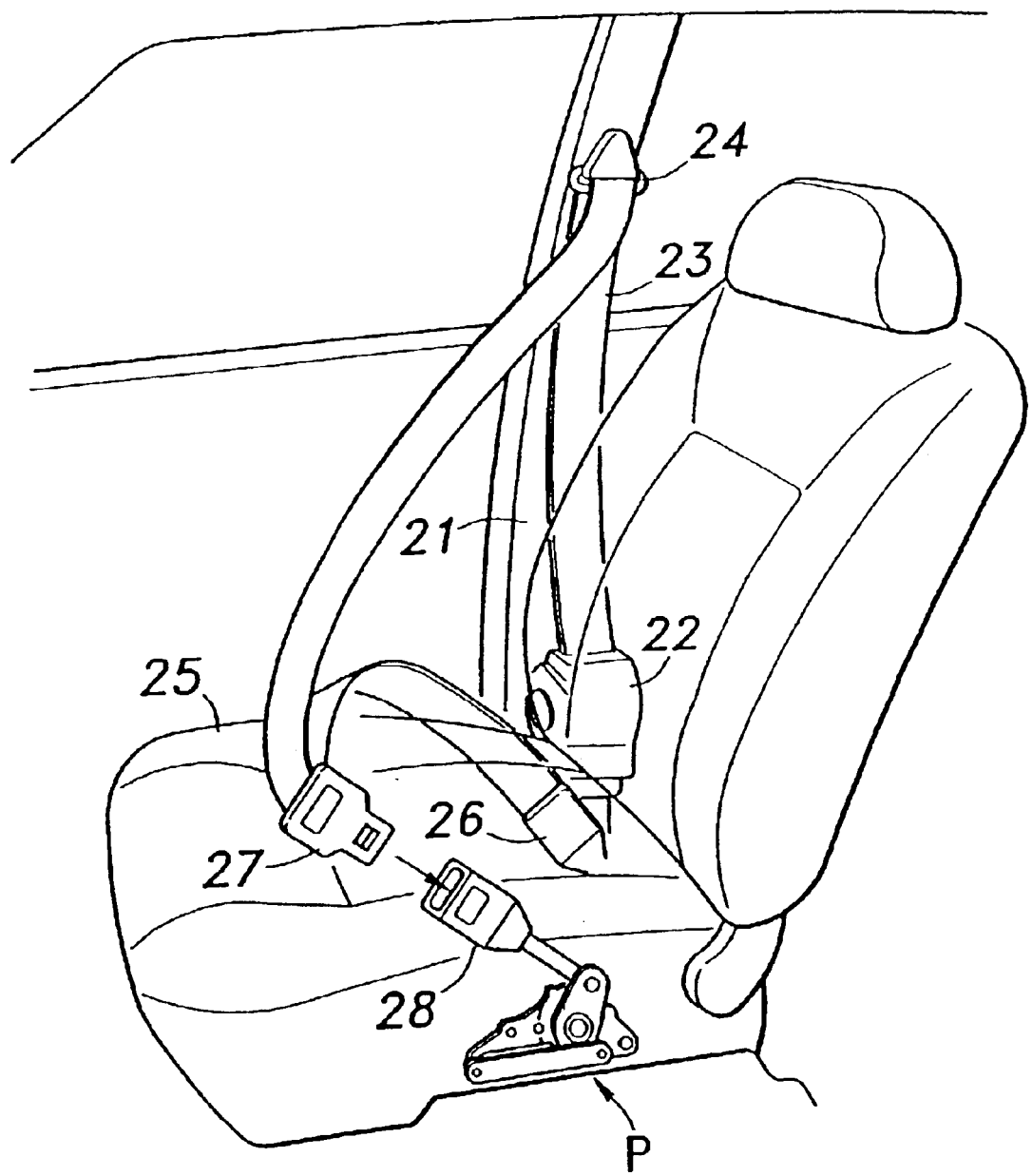
FIG. 7 is a perspective view of a vehicle seat fitted with a seat belt pretensioner device incorporated with the power actuator according to the present invention.

FIG. 7 shows the vehicle occupant restraint system in the form of a seat belt pretensioner device according to the present invention. Referring to FIG. 7, a seat belt 23 extends upward from an ELR device 22 fixedly attached to a lower part of a center pillar 21 in a passenger compartment, and is passed through a through ring 24 attached to an upper part of the center pillar 21. The free end 26 of this seat belt 23 is attached to a rear part of a side end of a seat 25. The part of the seat belt 23 extending between the through ring 24 and the free end 26 is provided with a tongue plate 27 that can be moved along the seat belt 23. The other side end of the seat 25 remote from the point of attachment of the seat belt free end 26 is provided with a buckle 28 via a pretensioner device P.

As the vehicle occupant in the seat 25 pulls out the seat belt 23 from the ELR device 22, and latches the tongue plate 27 into the buckle 28, the seat belt 23 is passed along the shoulder, chest and waist of the vehicle occupant.

Figure 8:
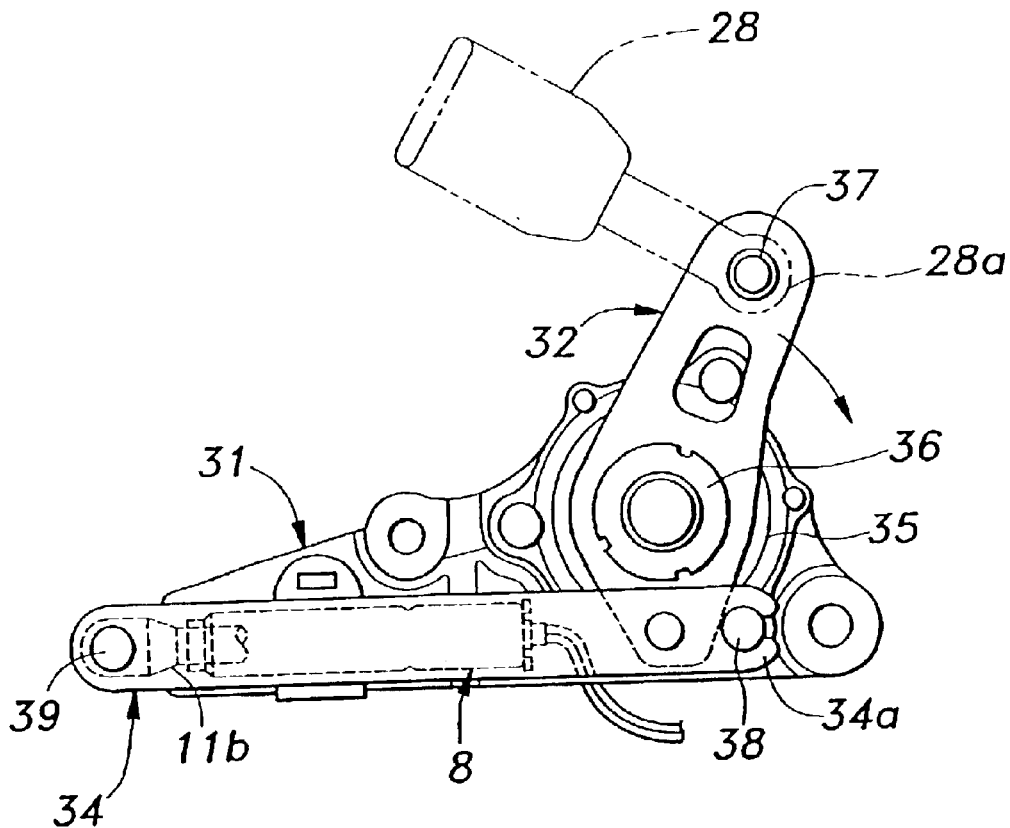
FIG. 8 is a side view of the seat belt pretensioner device.
Figure 9:
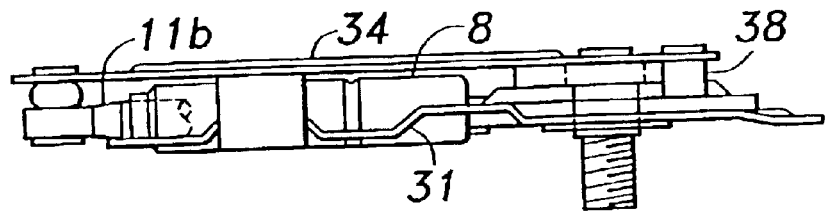
FIG. 9 is a bottom view of the seat belt pretensioner device.

The pretensioner device P is adapted to automatically increase the tension of the seat belt 23 in case of a vehicle crash, and, as illustrated in FIGS. 8 and 9, comprises a base plate 31 for fixedly attaching the assembly to a side of the seat 25, an arm 32 having one end pivotally attached to the base plate 31 and another end connected to an anchor portion 28a of the buckle 28, a power actuator 8 according to the present invention which is substantially fixed to the base plate 31, a link member 34 having one end connected to the working end of the power actuator 8 and another end connected to a part of the arm 32 at a certain radial distance from the pivot center of the arm 32, and a one-way lock mechanism 35, which may consist of a per se known ball-type one-way lock mechanism, for restricting the direction of rotation of the arm 32 to one direction.

To the base plate 31 is attached a center shaft 36 for supporting the arm 32. The arm 32 has an end pivotally attached to the center shaft 36 and an anchor pin 37 is fixedly attached to the other end of the arm 32 by projection welding or the like. The part of the anchor pin 37 projecting from a side of the arm 32 rotatably supports the anchor portion 28a of the buckle 28.

The one end of the link member 34 is pivotally connected to the working end of the power actuator 8 similar to the above described first embodiment or the free end of a piston rod 11b as described hereinafter, and the other end of the link member 34 is pivotally connected to the arm 32. A C-shaped portion 34a on the other end of the link member 34 engages a pin 38, and serves as a mechanical fuse for preventing inadvertent rotation of the arm 32.

Because this embodiment is provided with the one-way lock mechanism 35 and the fuse (the C-shaped portion 34a and the pin 38), the one-way lock mechanism 9 and the piston rod retainer 10 are omitted from the power actuator 8. However, it is also possible to use the one-way lock mechanism 9 and the piston rod retainer 10 for the power actuator 8 and omit the one-way lock mechanism 35 and the fuse (the C-shaped portion 34a and the pin 38). The power actuator 8 is otherwise similar to that of the first embodiment, and such parts are not described again. The open end 13c of the cylinder 13 on the working end may be reduced in diameter by swaging so as to slidably engage the outer circumferential surface of the intermediate part of the piston rod 11b as illustrated in FIG. 10.

When installing this power actuator 8 into the pretensioner device P, the cylinder 13 is fixedly attached to the base plate 31, and the piston rod 11b is then introduced into the cylinder 13 from the open working end 13c. The free end of the piston rod 11b is connected to the link member 34 via the pin 39.

Figure 11:
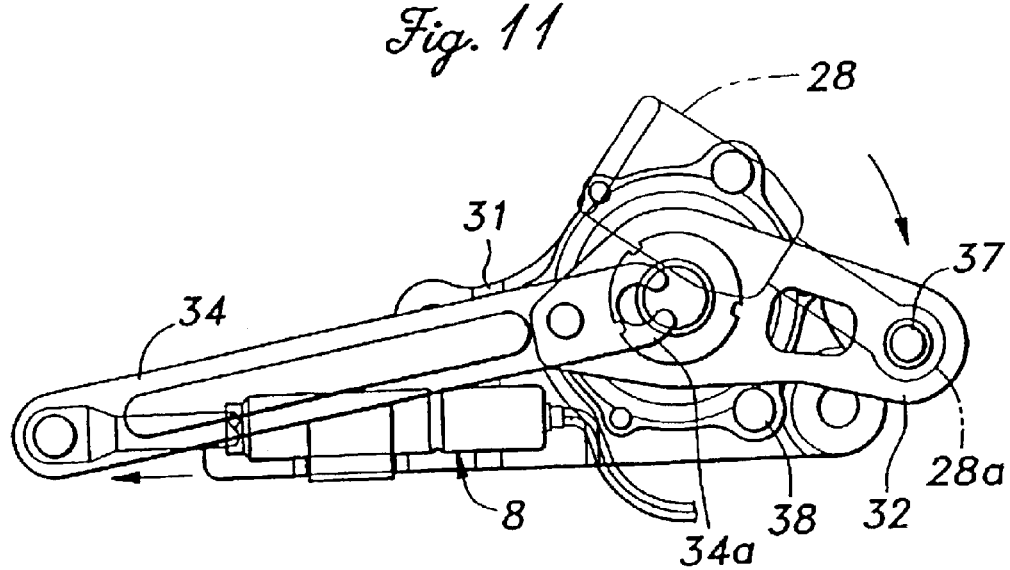
FIG. 11 is a side view for illustrating the mode of operation of the seat belt pretensioner device.

Now the mode of operation of this embodiment is described in the following. When a vehicle crash is detected by a deceleration sensor not shown in the drawing, the pyrotechnic material of the propellant 14 is ignited, and the thrust of the piston assembly 11 which is propelled by the resulting combustion gas is transmitted to the arm 32 via the link member 34, thereby causing the arm 12 to rotate. As a result, the buckle 28 is pulled in (see FIG. 11) to produce a tension of the seat belt 23 which increases the restraint of the vehicle occupant. At this point, even after the combustion gas has ceased to be generated, because the reverse preventing device 35 prevents the reverse rotation of the arm 32, any slackening of the seat belt 23 can be avoided.

Figure 10:
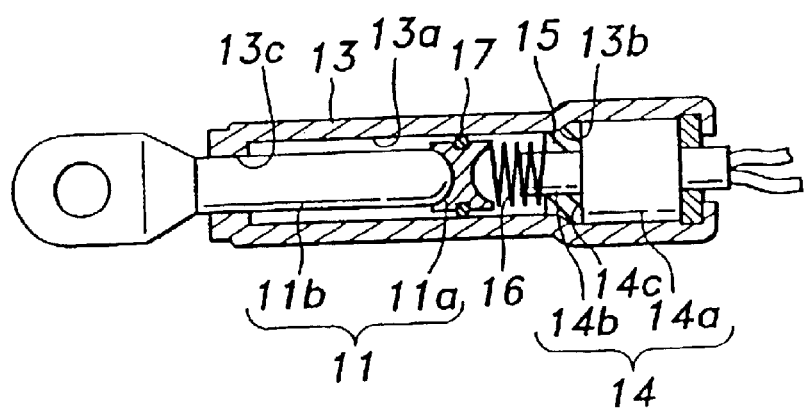
FIG. 10 is a sectional view showing the structure of the power actuator used for the seat pretensioner device.
Figure 12:
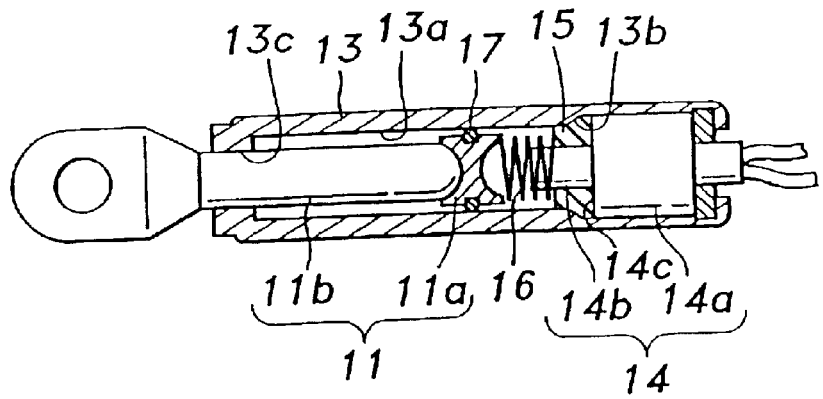
FIG. 12 is a view similar to FIG. 10 showing a modified embodiment of the power actuator.

FIG. 12 is a view similar to FIG. 10 showing a modified embodiment of the power actuator of the present invention. In this case, the outer diameter of the cylinder 13 is substantially uniform over its entire length, and the shoulder 13b is defined by changing the wall thickness of the inner bore 13a. This simplifies the installing of the power actuator 8. This embodiment is otherwise similar to that shown in FIG. 10.

Figure 13:
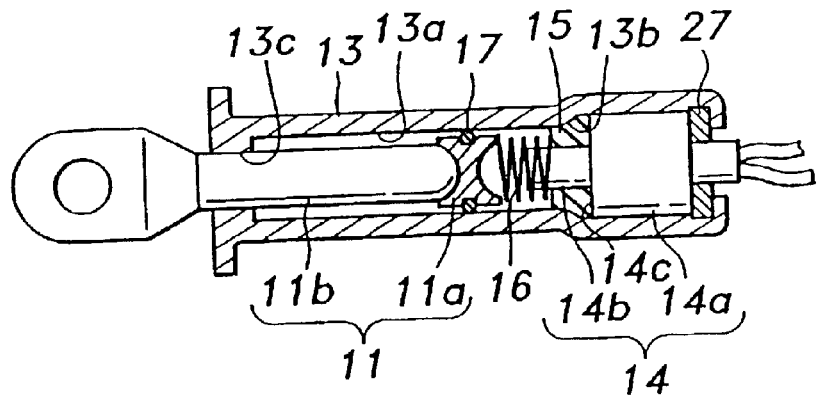
FIG. 13 is a view similar to FIG. 10 showing another modified embodiment of the power actuator.
Figure 15:
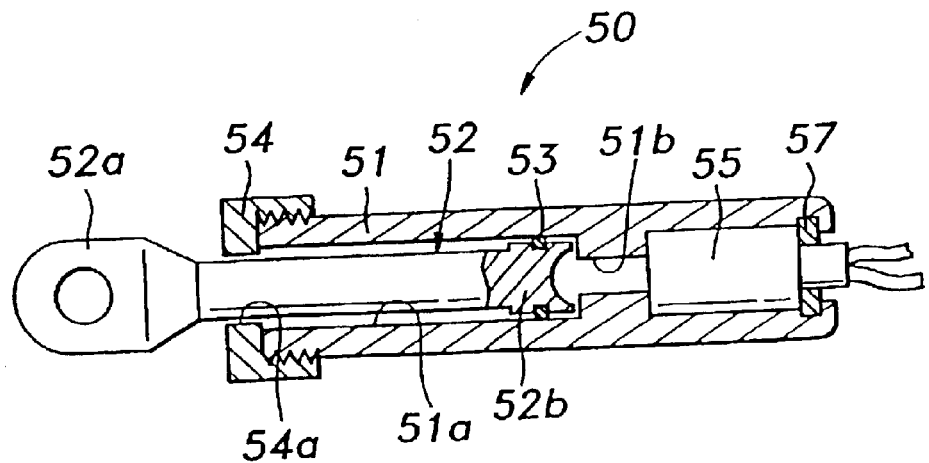
FIG. 15 is a view similar to FIG. 10 showing the conventional power actuator for a seat belt pretensioner device.

FIG. 13 is a view similar to FIG. 12 showing another modified embodiment of the power actuator of the present invention. In this case, a flange 13d is formed in the part of the cylinder 13 near its open working end 13c so that the reaction at the time of generating the gas may be supported not only by the rear end of the cylinder 13 but also by this flange 13d. This embodiment is otherwise similar to that shown in FIG. 10.

FIG. 14 is a view similar to FIG. 2, showing a vehicle occupant restraint system which combines an arrangement for preventing submarine with a seat belt pretensioner according to the present invention. In this embodiment, a pretensioner device 41 for automatically increasing the tension of the seat belt in case of vehicle crash is added to the structure of the vehicle occupant restraint system illustrated in FIGS. 2 to 6. The structure of the subassembly 4 (the power actuator 8, the one-way lock mechanism 9 and the piston rod retainer 10) is similar to that of the first embodiment, and is not described here again. In this embodiment, the power actuator 8 of one of the subassemblies 4 in the arrangement of the vehicle occupant restraint system illustrated in FIG. 2 serves also as the power actuator for moving the buckle 42 of the seat belt in the direction to apply tension to the seat belt in the pretensioner device 41. The one-way lock mechanism 9 additionally serves as the lock mechanism for retaining the buckle 42 of the seat belt so as to maintain the tension of the seat belt in the pretensioner device 41. The piston rod retainer 10 additionally serves as the means for preventing the buckle 42 from inadvertently moving under a normal condition. Such dual uses of the power actuator, the lock mechanism and the piston rod retainer of the two devices accomplish a substantial reduction in the number of component parts.

More specifically, the free end of the piston rod 11b of the power actuator 8 is connected to a base end of the buckle 42 via a link member 43 and a rotary arm 44. Therefore, when an impact such as a vehicle crash is detected by a sensor not shown in the drawing, gas is generated by the propellant 14 to rapidly increase the inner pressure of the cylinder 13 so that the free end of the piston rod 11b is instantaneously projected from the cylinder 13. This in turn causes the slip preventing member 7 to be raised (imaginary lines) and the buckle 42 to be pulled down (imaginary lines) to increase the tension of the seat belt for a more positive restraint of the vehicle occupant at the same time.

The power actuator of the present invention was applied to a vehicle occupant restraint system for preventing submarine and a seat pretensioner device in the above described embodiments, but the present invention can be applied to other applications where a drive force is required to be produced instantaneously, such as devices for moving the steering handle forward at the time of a vehicle crash to prevent the vehicle occupant from hitting the steering handle at the time of a vehicle crash, and ELR (emergency locking retractor) devices.

As can be appreciated from the foregoing description, according to a certain aspect of the present invention, in a vehicle occupant restraint system for preventing the vehicle occupant from slipping forward under the seat belt in case of an impact such as a vehicle crash, a slip preventing member which is vertically moveably supported by a casing fixedly attached to a seat frame is raised by a power actuator upon detection of an impact, and kept at the raised position. The power actuator comprises a piston assembly received in the cylinder one end of which either directly or indirectly engages the slip preventing member, and a propellant for rapidly increasing the inner pressure of the cylinder. Because the piston assembly is resiliently urged in the projecting direction by a spring, play in the system can be eliminated without increasing the size of the vehicle occupant restraint system.

According to another aspect of the present invention, the power actuator comprises a piston assembly which is received in a fixed cylinder for either directly or indirectly engaging a driven member, and a propellant for rapidly increasing the inner pressure of the cylinder to push the piston assembly outward so that the driven member may be instantaneously driven. A spring is interposed between the piston assembly and the propellant to urge the piston assembly in the projecting direction. The front end of the propellant fits into the central opening so that the available space may be fully utilized. Therefore, the size of the power actuator can be reduced, and the required amount of the propellant can be reduced due to the reduced initial volume of the chamber for the generation of gas.

According to yet another aspect of the present invention, the front end of the propellant is fit into the central opening of the spring to such an extent that a gap is defined between the piston assembly and a gas issuing point of the propellant on the front end thereof in a most compressed state of the spring. Therefore, the propellant and the spring means partly overlap each other, and can reduce the overall length of the cylinder. In other words, the piston stroke can be increased and/or the size of the propellant can be increased for a given length of the cylinder. Also, the interference between the piston and the propellant can be avoided even without using any spacer. When the propellant comprises a large diameter portion provided in a base end, a small end portion provided on a gas issuing front end, and a shoulder defined between these two portions to serve as a seat for the spring means, the number of component parts can be reduced. When the shoulder of the propellant engages a corresponding shoulder of the cylinder via a resilient seal member, the dimensional errors and positional errors of the cylinder and the propellant can be absorbed.

Although the present invention has been described in terms of preferred embodiments thereof, it is obvious to a person skilled in the art that various alterations and modifications are possible without departing from the scope of the present invention which is set forth in the appended claims.

What is claimed is:

1. A power actuator for rapidly actuating a driven member, said power actuator comprising:
   a cylinder;
   a piston received in said cylinder;
   a propellant received in said cylinder for selectively applying a pressure to said piston, a piston rod extending from said piston and having a free end connected to a driven member;
   a spring member received in said cylinder to urge said piston out of said cylinder; and
   a front end of said propellant received in a central hole of said spring member.

2. The power actuator according to claim 1, wherein an inner bore of said cylinder includes a shoulder opposing a shoulder of said propellant, and a resilient annular seal member is interposed between said shoulders of said cylinder inner bore and said propellant.

3. The power actuator according to claim 1, wherein the other end of said cylinder adjacent to said propellant is closed by crimping material of said piston over said propellant via a retaining plate.

4. The power actuator according to claim 1, wherein said propellant comprises a small diameter portion facing said piston, and a large diameter portion remote from said piston, a shoulder defined between said portions serving as a seat for said spring member.

5. The power actuator according to claim 1, wherein said piston rod simply abuts an opposing end of said piston so as to be readily separated therefrom, and an end of the inner bore of said cylinder remote from said propellant is larger than said piston rod but smaller than said piston in diameter.

6. The power actuator according to claim 1, wherein said piston rod simply abuts an opposing end of said piston via a spherical joint.

7. The power actuator according to claim 1, wherein said piston rod simply abuts an opposing end of said piston via a conical surface joint.

8. The power actuator according to claim 1, wherein said driven member is moveable between a rest position and a deployed position.

9. The power actuator according to claim 1, wherein said spring member comprises a compression coil spring.

10. The power actuator according to claim 1, further comprising a one-way lock mechanism for preventing reversal motion once said piston rod is actuated.

11. A power actuator for rapidly actuating a driven member, said power actuator comprising:
    a cylinder;
    a piston received in said cylinder;
    a propellant received in said cylinder for selectively applying a pressure to said piston, a piston rod extending from said piston and having a free end connected to a driven member;

a spring member received in said cylinder to urge said piston out of said cylinder;

a piston rod retaining member provided at an end of said cylinder remote from said propellant for resisting inadvertent movement of said piston rod during handling but permitting movement of said piston rod when said piston is actuated by said propellant; and a front end of said propellant received in a central hole of said spring member.

12. The power actuator according to claim 11, wherein an inner bore of said cylinder includes a shoulder opposing a shoulder of said propellant, and a resilient annular seal member is interposed between said shoulders of said cylinder inner bore and said propellant.

13. The power actuator according to claim 11, wherein the other end of said cylinder adjacent to said propellant is closed by crimping material of said piston over said propellant via a retaining plate.

14. The power actuator according to claim 11, wherein said propellant comprises a small diameter portion facing said piston, and a large diameter portion remote from said piston, a shoulder defined between said portions serving as a seat for said spring member.

15. The power actuator according to claim 11, wherein said piston rod simply abuts an opposing end of said piston so as to be readily separated therefrom, and an end of the inner bore of said cylinder remote from said propellant is larger than said piston rod but smaller than said piston in diameter.

16. The power actuator according to claim 11, wherein said piston rod simply abuts an opposing end of said piston via a spherical joint.

17. The power actuator according to claim 11, wherein said piston rod simply abuts an opposing end of said piston via a conical surface joint.

18. The power actuator according to claim 11, wherein said driven member is moveable between a rest position and a deployed position.

19. The power actuator according to claim 11, wherein said spring member comprises a compression coil spring.

20. The power actuator according to claim 11, further comprising a one-way lock mechanism for preventing reversal motion once said piston rod is actuated.

* * * * *